United States Patent [19]
Morin

[11] 3,831,377
[45] Aug. 27, 1974

[54] METHOD OF AND APPARATUS FOR REDUCING POLLUTION CAUSED BY EXHAUST GASES OF AN INTERNAL COMBUSTION ENGINE

[76] Inventor: Albert Z. Morin, 973 Ann St., North Bay, Ontario, Canada

[22] Filed: July 24, 1972

[21] Appl. No.: 274,804

[52] U.S. Cl............... 60/274, 55/DIG. 30, 60/279, 60/309, 60/311, 50/320, 123/119 A
[51] Int. Cl......................... F02m 25/06, F01n 3/02
[58] Field of Search............ 60/273, 274, 309, 310, 60/320, 278, 279, 311; 123/119 A; 55/DIG. 30

[56] References Cited
UNITED STATES PATENTS

| | | | |
|---|---|---|---|
| 1,756,897 | 4/1930 | Bilsky | 60/279 |
| 2,115,228 | 4/1938 | Lundquist | 60/279 |
| 2,461,580 | 2/1949 | Wiczer | 60/279 |
| 2,612,745 | 10/1952 | Vecchio | 60/309 |
| 2,921,432 | 1/1960 | Marcotte | 60/309 |
| 3,066,755 | 12/1962 | Diehl | 60/279 |
| 3,100,146 | 8/1963 | Huntington | 60/309 |
| 3,282,047 | 11/1966 | Wertheimer | 55/DIG. 30 |
| 3,699,683 | 10/1972 | Tourtellotte | 60/274 |

*Primary Examiner*—Douglas Hart

[57] ABSTRACT

A method and apparatus for treating the exhaust emissions of an internal combustion engine to reduce the pollution of the atmosphere caused thereby that employs a closed circuit cooling system to substantially reduce the temperature of the exhaust contracting its volume, condensing gaseous vapours to liquid form; drains off the liquid, filters the dewatered gases to remove solids; stratifies the filtered gas and conveys the lighter more volatile gases to the engine fuel intake, discharging the residual fraction of cooled, contracted, dewatered and filtered heavier gases to the atmosphere. Additionally, any volatile fumes rising off the liquids collected from the exhaust flow may also be fed to the engine fuel intake. The closed circuit cooling system includes a radiator separate from the engine's usual radiator and an engine operated pump for driving the coolant in the system.

3 Claims, 4 Drawing Figures

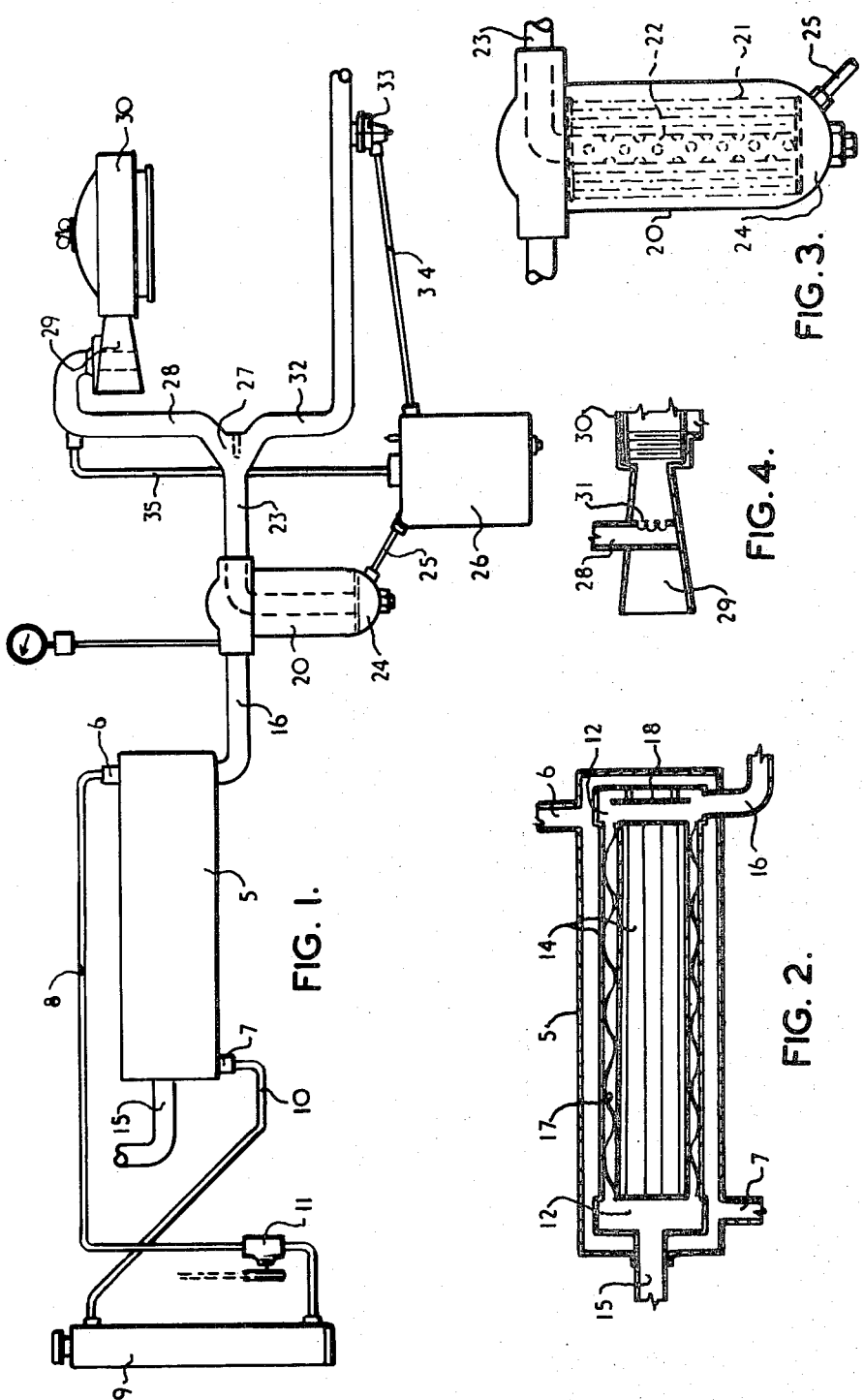

3,831,377

METHOD OF AND APPARATUS FOR REDUCING POLLUTION CAUSED BY EXHAUST GASES OF AN INTERNAL COMBUSTION ENGINE

The present invention relates to improvements in a filtering method and apparatus therefor and appertains particularly to such a method and/or apparatus suitable for use in treating the exhaust gases emitted by an internal combustion engine to reduce the pollution of the atmosphere caused thereby.

The composition of the exhaust gases emitted by automobiles and other internal combustion engines is now recognized as including deleterious unsaturated hydrocarbons, carbon monoxide, oxides of nitrogen and other components in such volume as to seriously endanger the health of people living in areas of high motor car density.

Accordingly, it is an object of this invention to provide a method of treating engine exhaust gases to separate out as substantial a part as possible of the components that dangerously pollute the atmosphere.

A further object of the invention is to provide a method of initially cooling the hot exhaust gases to contract the overall volume and liquefy some of the components and subsequently filtering the remaining gases.

A further object of the invention is to provide a method as hereinbefore mentioned wherein the exhaust emissions that continue in gaseous form after the liquefying step are filtered to remove solids and finally, at least in part, fed back to the engine fuel intake.

A further object of the invention is to provide a method as hereinbefore mentioned wherein such fractional part of the gaseous emission as is discharged to the atmosphere has been devaporized and substantially reduced in temperature thereby lessening the creation of smog.

A further object of the invention is to provide a method as hereinbefore mentioned wherein the liquefied parts of the exhaust are collected in a holding tank, and the fumes therefrom are fed to the engine intake.

A further object of the invention is to provide an efficient and practical apparatus for attachment to and operation by an internal combustion engine for reducing the pollution of the atmosphere caused by the exhaust gases discharged thereby.

A still further object of the invention is to provide a method and/or apparatus as aforesaid useable with an internal combustion engine, such as the type employed in a conventional motor car, that can be produced, operated and maintained at reasonable cost and is thereby rendered commercially desirable.

To the accomplishment of these and related objects, the invention resides in the method and/or the construction, operation and arrangement of parts of the apparatus as shall be hereinafter more fully described, illustrated in the accompanying drawings and pointed out in the claims hereunto appended.

In the drawings:

FIG. 1 is an elevational diagram of an embodiment of the apparatus useable in carrying out the invention;

FIG. 2 is an enlarged vertical longitudinal section of the cooling chamber;

FIG. 3 is an enlarged elevation, partly in section of the filter; and

FIG. 4 is a fragmentary enlarged vertical section of the intake mouth of the engine carburetor air filter, showing the feed of exhaust gases thereto.

Though capable of adaptation in some measure to a wide variety of industrial and/or domestic uses, the filtering method and apparatus herein disclosed is shown and described in an embodiment specifically designed for use with the internal combustion engine of an automobile.

Briefly stated, this method of treating engine exhaust calls for putting the entire engine exhaust through a cooling process to (*a*) lower the temperature thereof, (*b*) contract the over-all volume, and (*c*) condense at least some of the components to liquid form. It is estimated that the exhaust temperature at the manifold may run as high as 500°F or more and, in addition to contracting the total over-all volume, the aim is to reduce the temperature of such residue of gases as may be finally discharged to the atmosphere to a normal range of approximately 70° – 90° F thus greatly curtailing the creation of smog.

After cooling, the liquid can be drained off and the gaseous part of the exhaust is filtered to remove solids then the cooled, dewatered and filtered gas is fed to the intake of the engine's carburetor air filter to utilize the combustibles therein, whilst any surplus gas is afforded egress to the atmosphere. Here again, any liquids resulting from condensation downstream from the cooling and/or filtering of the exhaust can be trapped near the outlet of such surplus gas and fed, along with the earlier separated liquid, to a holding tank, with any combustible gases arising therefrom being piped also to the engine's fuel intake or carburetor air filter as mentioned.

In giving effect to such a method, an embodiment of the apparatus useable with an automobile internal combustion engine is shown in diagrammatical layout in FIG. 1. First there is a cooling chamber comprising an elongated housing 5 having an inlet 6 in the top near one end and an outlet 7 in the bottom near the other end. A coolant in a closed circuit is supplied by tube 8 to the housing inlet 6 from an additional or independent radiator 9 and returned thereto by tube 10 from the outlet 7. The circuit flow is propelled by a pump 11 in the supply tube 8 that may be driven by the engine's fan belt.

Within the cooling chamber a heat exchanger is disposed comprising a pair of spaced headers 12 located near opposite ends of the housing 5 and are connected by a plurality of tubular passages 14 preferably arranged in two or more concentric circles. An exhaust inlet pipe 15 runs into the header 12 near the coolant outlet end of housing 5 and an exhaust outlet pipe 16 runs out through the bottom of the housing near the other end. In some cases it is useful to provide spiral deflectors 17 in the exhaust carrying tubes 14 to direct the gases flowing therethrough against the walls for improved heat exchange relation as well as to moderate the flow passage. Baffling as required is also installed such as the centrally apertured baffle plate 18 in the outlet end header, spaced inwardly from the end wall of the header to absorb some of the impact of the flow emerging from the tubes.

The cooled, contracted exhaust, with some of the gaseous vapours having now been condensed to liquid form, is carried by the outlet pipe 16 to a filter unit 20 where a gauge may monitor the temperature and/or pressure of the flow. This filter unit contains a filter element cartridge 21 in sealed relation with the unit housing through which the gases must pass to find outlet through a perforated core 22 of a conduit 23. The condensed vapours that emerge from the cooling chamber 5 in liquid form, if not previously drained off, collect in the sediment well 24 of the filter unit along with the particles and solids not passed by the filter element 21 and flow out by a tube 25 into a liquid holding tank 26.

The conduit 23 carrying the filtered gases is bifurcated preferably in an enlarged Y or fork 27 where some separation or stratifying occurs so that the lighter and more volatile gases flow through the upper conduit branch 28 to the radial mouth 29 of the engine's carburetor air intake filter housing 30, the outlet end of the conduit branch 28 standing in filter housing mouth 29 being perforated as by apertures or discharge ports 31 on its inner side.

From the conduit fork 27 a lower conduit branch 32 discharges to the atmosphere that fractional portion of the cooled, contracted, devaporized filtered and stratified gas as is not drawn into the engine's fuel intake by the upper conduit branch 28. To pick up any condensation occurring in the exhaust flow subsequent to the liquid drain-off tube 25, a screened liquid trap 33 is inserted in the lower conduit branch 32 near its outlet end with a drain tube 34 running to the liquid holding tank 26. A feed pipe 35 rising from the top of the air vented tank connects with the upper conduit branch 28 running into the carburetor air filter intake to convey any volatile fumes rising from the liquids in the tank.

In summary, this invention will contribute substantially to lessening the pollution of the atmosphere by cooling the engine's exhaust, contracting its over-all volume, condensing and draining off in liquid form at least some of the vapour components, filtering out particles and solids, separating the cooled, contracted, devaporized and filtered gases as by stratification feeding one substantial part of such filtered gases to the engine's fuel intake and discharging to the atmosphere only such fractional part of said filtered gases as is surplus to the engine's fuel intake call.

From the foregoing description taken in connection with the accompanying drawings, it will be manifest that an effective and practical method and apparatus for treating the exhaust emissions of an internal combustion engine is provided that will fulfil all the necessary requirements thereof but it is to be understood that changes can be made therein and different embodiments of the invention may be constructed without departing from the spirit of the invention or scope of the claims.

What is claimed is:

1. A method of treating the exhaust gases of an internal combustion engine to lessen the pollution caused by the discharge of dangerous components thereof into the atmosphere comprising the steps of passing the entire engine exhaust through a cooling chamber to lower the temperature thereof, contract the over-all volume and condense at least some of the gases to liquid form and subsequently draining off the liquid, including circulating a coolant from an independent radiator system about said chamber in heat exchange relation with said engine exhaust, wherein the cooled and contracted engine exhaust emerging from said chamber is passed through a filter element where the liquid is separated and solids are removed, and finally separating the gaseous output of the filter by stratification in a bifurcated conduit that feeds the lighter more volatile gases to the air intake of the engine and discharges only the residual fractional part not drawn into the engine's air intake to the atmosphere.

2. An apparatus for reducing pollution caused by the discharge into the atmosphere of the exhaust gases of an internal combustion engine comprising in combination a cooling chamber connectible with the exhaust manifold of the engine and into which the entire exhaust discharge of the engine may be passed; means for circulating a coolant about said chamber in heat exchange relation with the engine exhaust therein to reduce the temperature thereof, contract the over-all thereof, contract the over-all volume and condense to liquid form at least some of the components of the engine exhaust discharge; a drain for the release of liquids emerging from said cooling chamber, a filter in communication with said cooling chamber through which the remaining gases flow for the separation of solids therefrom, a gas outlet conduit running from said filter that is bifurcated with an upper connection running to the air intake of the engine and the lower connection discharging to the atmosphere, and said lower connection having a liquid trap near its outlet end, and a liquid receiving tank, an air intake vent therein, tubes to said tank for carrying liquids released from said cooling chamber and the liquid trap in said lower connection respectively, and a feed pipe from the top of said tank to the connection running to the engine's air intake.

3. An apparatus according to claim 2 wherein the coolant circulating means includes an independent radiator connected with said chamber by feed and return pipes and an engine-operated pump in the former.

* * * * *